(12) United States Patent
Scales et al.

(10) Patent No.: US 7,840,839 B2
(45) Date of Patent: Nov. 23, 2010

(54) STORAGE HANDLING FOR FAULT TOLERANCE IN VIRTUAL MACHINES

(75) Inventors: Daniel J. Scales, Mountain View, CA (US); Michael Nelson, Alamo, CA (US); Andrew Tucker, Menlo Park, CA (US); Eric Lowe, Pflugerville, TX (US)

(73) Assignee: VMware, Inc., Palo Alto, CA (US)

( * ) Notice: Subject to any disclaimer, the term of this patent is extended or adjusted under 35 U.S.C. 154(b) by 291 days.

(21) Appl. No.: 12/207,292

(22) Filed: Sep. 9, 2008

(65) Prior Publication Data

US 2009/0119538 A1    May 7, 2009

Related U.S. Application Data

(60) Provisional application No. 60/985,953, filed on Nov. 6, 2007.

(51) Int. Cl.
*G06F 11/00* (2006.01)

(52) U.S. Cl. .......................................... 714/13; 707/610

(58) Field of Classification Search ........................ None
See application file for complete search history.

(56) References Cited

U.S. PATENT DOCUMENTS

| | | | | |
|---|---|---|---|---|
| 6,625,751 | B1 * | 9/2003 | Starovic et al. ................ 714/11 |
| 6,735,717 | B1 * | 5/2004 | Rostowfske et al. .......... 714/13 |
| 7,093,086 | B1 * | 8/2006 | van Rietschote ............ 711/161 |
| 7,287,186 | B2 * | 10/2007 | McCrory et al. ............... 714/13 |
| 7,774,646 | B2 * | 8/2010 | Smith et al. .................... 714/13 |
| 2003/0018927 | A1 * | 1/2003 | Gadir et al. ..................... 714/4 |
| 2003/0188233 | A1 * | 10/2003 | Lubbers et al. .............. 714/100 |
| 2008/0126853 | A1 * | 5/2008 | Callaway et al. .............. 714/13 |
| 2009/0300414 | A1 * | 12/2009 | Huang et al. ................... 714/11 |

OTHER PUBLICATIONS

Friedman et al., "Transparent Fault-Tolerant Java Virtual Machine", 2003, IEEE.*

* cited by examiner

*Primary Examiner*—Gabriel L Chu (57) ABSTRACT

A fault-tolerant virtualized computer system comprises a primary host executing a primary virtual machine (VM) and a backup host executing a backup VM. In one embodiment, each VM includes a virtual disk mapped to a shared disk image on physical disk accessible to both hosts. A virtual disk IO request is received by virtualization software executing on the backup host from a backup VM. When the virtual disk IO request is a read request, the virtual disk IO request is mapped to a physical read IO request of a virtual disk image stored on a physical disk, the physical read IO request is issued to the physical disk. However, when the virtual disk IO request is a write request, it is assumed to be completed without mapping the virtual disk IO request or issuing a mapped physical IO request to the physical disk.

18 Claims, 9 Drawing Sheets

STORAGE HANDLING FOR FAULT TOLERANCE IN VIRTUAL MACHINES

CROSS-REFERENCE TO RELATED APPLICATION

This application claims benefit under 35 U.S.C. §119(e) from U.S. Provisional Patent Application No. 60/985,953, entitled "Transitioning of Virtual Machine from Replay Mode to Live Mode," filed on Nov. 6, 2007.

BACKGROUND

Virtualized computer systems have been used to provide fault tolerance capability. In these systems, a primary host computer system provides a primary virtual machine (VM) which executes a guest operating system and whatever applications or programs are required for the particular implementation. A second computer system, referred to herein as the "backup host" executes an identical virtual machine, referred to herein as the "backup VM" in parallel with the primary VM. The identical virtual machines are configured identically with software and virtual hardware, and have identical virtual disks. They are executed simultaneously so that the virtual processors on each VM follow identical execution paths. In this fault-tolerant mode of operation, only the primary VM communicates with the outside world, i.e., providing services as needed to other computer systems or devices connected over a network or system bus. If the primary host fails, then the backup VM on the backup host can immediately take over.

In order for the backup VM to effectively reproduce the execution of the primary VM, it must receive nondeterministic events at the same point in its execution as the primary VM. Nondeterministic events are events that cannot be predicted based on the state of the processor. They include (i) inputs from the network external to the virtualized computer system, (ii) information regarding when virtual interrupts were delivered to the virtual processor due to external events, (iii) timer interrupts delivered to the processor, and (iv) timestamps delivered to the processor when it acquires the current time via various hardware functionality. To ensure synchronicity of nondeterministic events, existing systems use what is referred to as "record-replay". In a record operation, the primary VM records each nondeterministic event, along with identifiers that specify the point in execution of the primary VM at which the nondeterministic event is received. These events are recorded in a log that is provided to the backup host, which injects the events into the backup VM at the corresponding point in its execution. Thus, the backup VM executes at a slight delay, on the order of hundreds of milliseconds, from the host VM.

There are a number of storage-related issues that arise in order to effectively implement record and replay for VM fault tolerance. The general problem is that input/output (IO) to storage devices is asynchronous, and hence can be another source of non-determinism. For example, the state of the disk can be non-deterministic if multiple asynchronous IOs attempt to write to the same location on the disk. Also, in virtualized computer systems, physical DMA (Direct Memory Access) may be done directly from the physical disk that contains an image of the virtual disk to memory mapped to the virtual machine's virtual memory, and thus races on memory access may arise as well. That is, disk IOs may be implemented via DMA directly to the virtual memory of the VMs. Thus, any possible races caused by the asynchronous modification of the virtual memories the VMs should be resolved. In addition, the exact same IO to a storage device can result in different completion statuses (either success or various kinds of errors), so the IO completion status can be another source of non-determinism.

Conventional computer systems typically implement fault tolerance by running virtual machines in exact lockstep by using specialized hardware. However, this solution is not possible for commodity systems with no specialized hardware for the computer systems to provide fault tolerance.

SUMMARY

Embodiments of the present disclosure include a method and system for handling storage issues to facilitate record and replay for virtual machine fault tolerance by preventing a variety of potential races that can result from the asynchronous nature of IO to virtual memories and storage devices and preventing those potential races. A variety of techniques are employed to remove such potential races or to log data that ensures that the backup VM will reach the same state as the primary VM after the race is finished.

In one embodiment, a shared storage architecture in a fault-tolerant virtualized computer system is provided. The fault-tolerant virtualized computer system comprises a primary host executing a primary virtual machine (VM) and a backup host executing a backup VM. Each VM includes a virtual disk mapped to a shared disk image on physical disk accessible to both hosts. In one embodiment, a virtual disk IO request is received from a backup VM. When the virtual disk IO request is a read request, the virtual disk IO request is mapped to a physical read IO request of a virtual disk image stored on a physical disk, the physical read IO request is issued to the physical disk. However, when the virtual disk IO request is a write request, it is assumed to be completed without mapping the virtual disk IO request or issuing a mapped physical IO request to the physical disk.

In another embodiment, the virtual disk of the backup VM is mapped to a disk image distinct from the disk image mapped to the virtual disk of the primary VM.

BRIEF DESCRIPTION OF THE DRAWINGS

The present disclosure can be readily understood by considering the following detailed description in conjunction with the accompanying drawings, in which.

DETAILED DESCRIPTION OF EMBODIMENTS

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
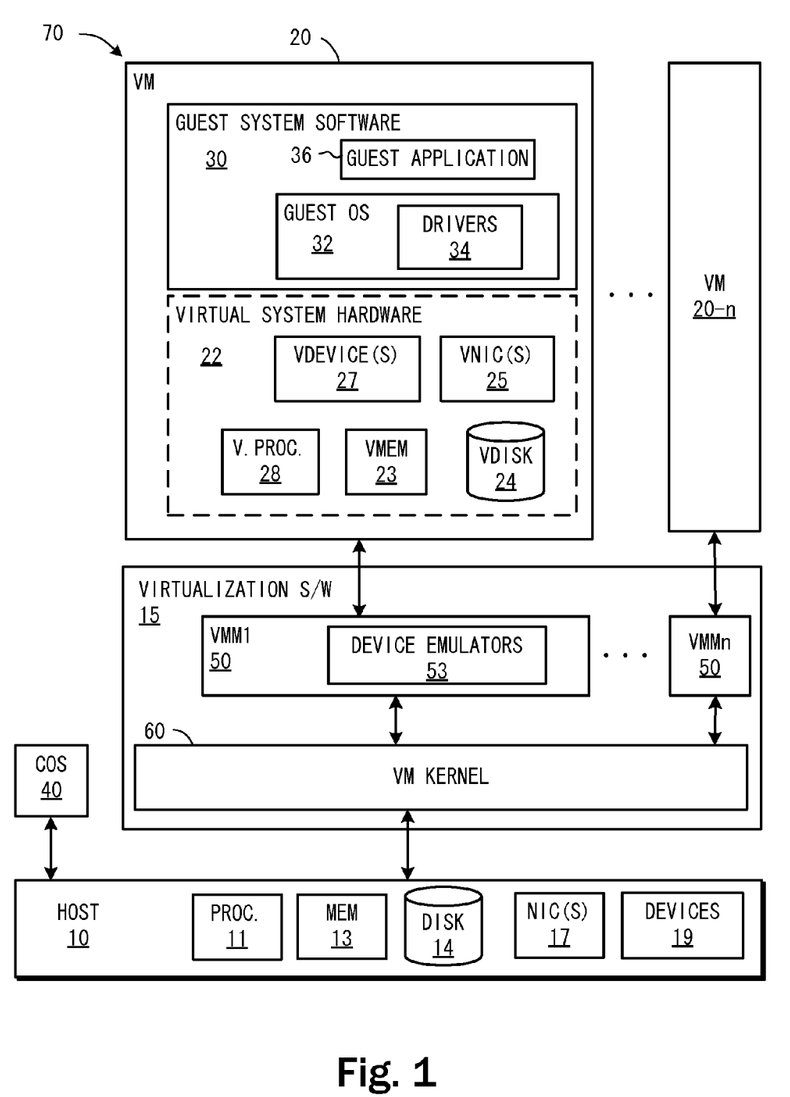
FIG. 1 illustrates a non-hosted virtualized system.

FIG. 1 shows an exemplary virtualized computer system 70 that is suitable for implementing as a fault tolerant system. In this arrangement, a plurality of VMs 20 ... 20-n are abstracted by virtualization software 15 on a host 10. In the present example, virtualization software 15 includes a VM kernel 60 and one or more VM monitors (VMMs) 50. Other configurations are possible to provide virtualization functionality as generally understood in the art. Host 10 may be a physical general-purpose computer system having one or more processors 11, memory 13, disk 14 for non-volatile mass data storage, one or more network interface cards (NICs) 17, and various other devices 19. As generally known, the term "NIC" commonly refers to components implementing a network connection regardless as to whether it exists on a separate card or is integrated with a main computer board or other component.

Each VM 20 ... 20-n can be thought of as including both virtual system hardware 22 and guest system software 30. Virtual system hardware 22 typically includes one or more virtual processors 28, virtual memory 23, at least one virtual disk 24, and one or more virtual network interface cards (VNICs) 25 (only one shown). One or more additional virtual devices 27, such as virtual user interface devices, universal serial bus (USB) ports, etc., may also be included. Virtual system hardware 22 is shown in FIG. 1 in a dashed box because it is merely a conceptualization that does not exist apart from virtualization software 15 and host 10. This conceptualization is merely one representation of the execution environment of guest system software 30. All of the virtual hardware components of VM 20 are actually implemented by virtualization software 15 using known techniques to emulate the corresponding physical components. In the present example, virtualization software 15 includes one or more VM monitors (VMMs) 50 which each include device emulators 53.

Guest system software 30 includes guest operating system (OS) 32 and drivers 34 as needed for VNIC 25, virtual disk 24, and other various devices 27. Guest OS 32 may be an off-the shelf commodity OS designed to run directly on a hardware platform (i.e., not in a virtual machine) or it can be an OS specially modified to run in a para-virtualized environment, depending on what is required or permitted by the particular implementation of virtualization software 15. For the purposes herein, the term "virtualization" includes both full and para-virtualization.

In addition to guest operating system 32, one or more guest applications 36 execute "within" VM 20, although those skilled in the art will understand that execution of guest OS and guest application instructions occurs via virtualization software 15 and host platform 10. Guest application 36 may be any type of application designed to work with guest operating system 32. As generally understood in the art of virtualization, user input and output to and from VM 20 may be redirected by virtualization software 15 to a remote terminal (not shown) or through a terminal application (not shown) executing on console operating system 40.

Virtualization software 15 may include one or more software components and/or layers, possibly including one or more of the software components known in the field of virtual machine technology as "virtual machine monitors" (VMMs), "hypervisors," or virtualization kernels (referred to herein as "VM kernels"). Because virtualization terminology has evolved over time and has not yet become fully standardized, these terms do not always provide clear distinctions between the software layers and components to which they refer. As used herein, the term, "virtualization software" is intended to generically refer to a software layer or component logically interposed or interfacing between a virtual machine and the host platform.

In the virtualization system shown in FIG. 1, VMMs 50 are deployed on top of VM kernel 60. In one embodiment, VM kernel 60 may be constructed specifically to provide efficient support for the VMs and directly (i.e., not using a general-purpose host OS, such as Linux or Windows) interfaces with the physical resources and devices making up host 10. Note that VM kernel 60 is not the same as the kernel that will be within the guest OS 32. As is well known, each typical operating system has its own OS kernel. Note also that VM kernel 60 can be viewed as being part of the host platform for the VM even though the configuration shown in FIG. 1 is commonly termed "non-hosted."

In a different, well-known configuration (not shown) virtualization software 15 could include a host operating system (not shown) instead of a VM kernel. In such a "hosted" virtualized computer system, an existing, general-purpose operating system, referred to as the "host" OS, runs at a system level directly on the hardware. The host OS is configured to perform certain device input/output (I/O) operations and resource management for the various VMs executing on the system, alongside and sometimes at the request of the VMM. In this case, the host OS may be considered to be part of the virtualization software that enables the virtualization. The selection of the configuration of the virtualization software, i.e., whether hosted or non-hosted, or whether it is fully virtualized or para-virtualized, are made based on the relative advantages and disadvantages of each type, which are well known to those skilled in the art of virtualized computer systems.

Figure 2:
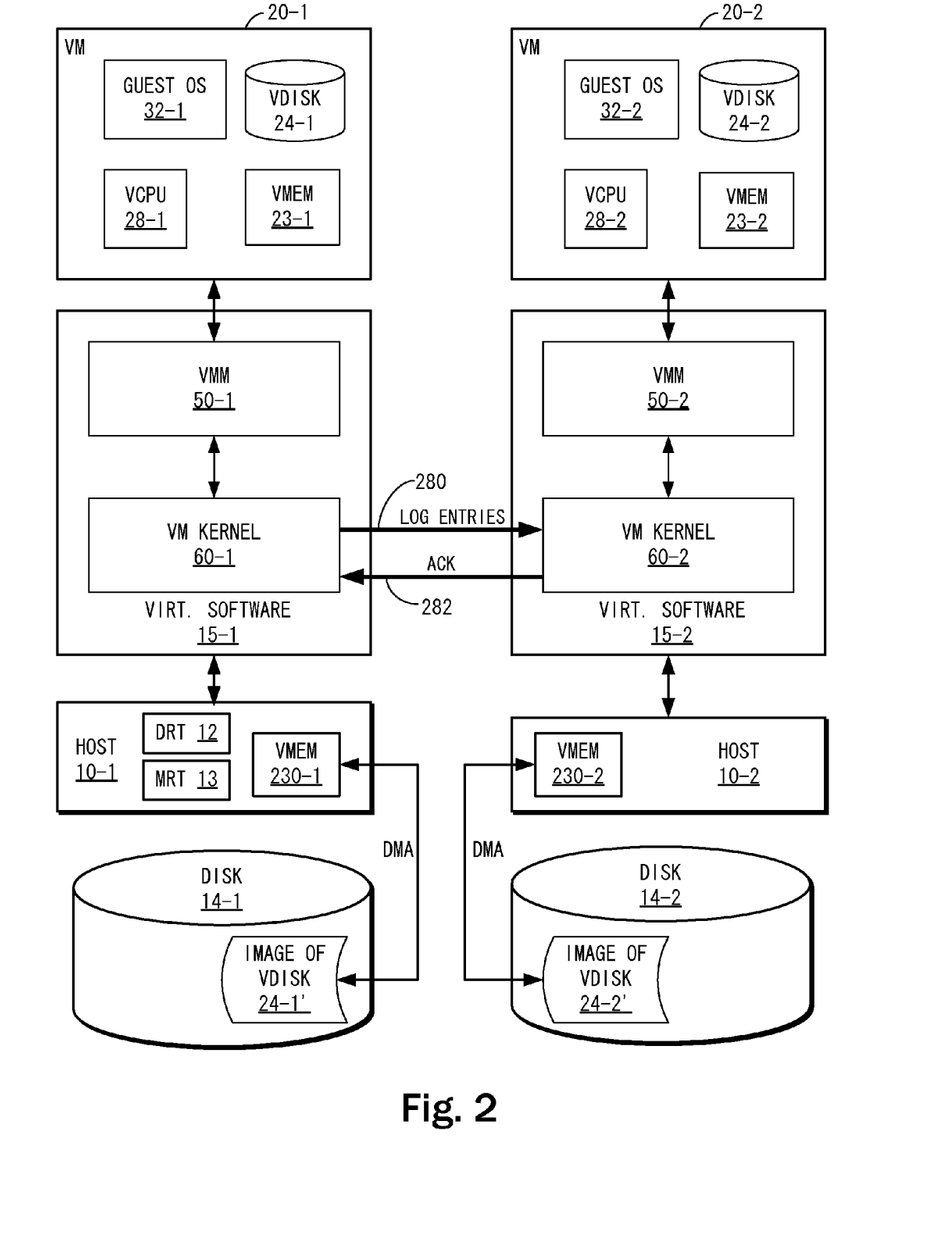
FIG. 2 illustrates a system for providing fault tolerance using a backup VM supporting the primary VM, with the primary VM and backup VM each accessing its separate virtual disk on separate physical devices.

FIG. 2 illustrates primary and backup virtualized computer systems arranged for fault tolerance. In this embodiment, primary VM and backup VM each access corresponding virtual disks 24-1, 24-2, which are mapped to separate disk images 24-1', 24-2' which may be on separate physical disks 14-1, 14-2. Primary VM 20-1 communicates externally of the virtualized computer system over a network connection (not shown). In addition, primary VM 20-1 and backup VM 20-2 are in communication over a network connection so that log entries 280 and acknowledgements 282 may be communicated between them. In this fault-tolerance setup, backup VM 20-2 is configured to take over almost instantaneously if primary host 10-1 or primary VM 20-1 fails.

Virtualization software 15-1, which in this embodiment includes VMM 50-1 and VM kernel 60-1, runs on the host 10-1. Virtualization software 15-1 and host 10-1 include or are in electronic communication with physical disk 14-1, which includes thereon an image 24-1' of virtual disk 24-1. Thus, host 10-1 includes one or more physical processors (not shown) which execute virtualization software 15-1, which emulates virtual disk 24-1, using image 24-1' maintained in physical disk 14-1. Likewise, virtualization software 15-2 running on backup host 10-2 includes VMM 50-2 and VM kernel 60-2. Virtualization software 15-2 and host 10-2 include or are in electronic communication with physical disk 14-2, which includes thereon an image 24-2'. Backup VM 20-2 runs on backup host 10-2 by way of virtualization software 15-2. Physical disks 14-1, 14-2 may be implemented, e.g., as local physical disks or logical drives on a network attached storage (NAS) or storage area network (SAN) using redundant disk arrays such as a RAID configuration. Disks 14-1, 14-2 may be implemented using rotating media or using solid state technology.

VMs 20-1, 20-2 are executed in near lockstep for fault tolerance by recording (logging) all non-deterministic inputs or events encountered by the primary VM 20-1 in log entries 280, which are sent to backup host 10-2. VMkernel 60-1 corresponding to the primary VM 20-1 records such logs and sends the log entries 280 to VMkernel 60-2 corresponding to backup VM 20-2. Non-deterministic inputs/events are events that are not dependent on the current state of virtual processor (VCPU) 28-1 and include, for example, (i) inputs from the network external to the virtualized computer system, (ii) information regarding when virtual interrupts were delivered to VCPU 28-1 due to external events, (iii) timer interrupts delivered to VCPU 28-1, and (iv) timestamps delivered to VCPU 28-1 when the VCPU 28-1 acquires the current time via various hardware functionality. Backup host 10-2 then uses log entries 280 to ensure that backup VM 20-2 executes exactly the same instruction stream as primary VM 20-1 (i.e., backup VM 20-2 replays the log 280). VMkernel 60-2 corresponding to backup VM 20-2 sends acknowledgments (ACK) 282 back to VMkernel 60-1, indicating which log entries 280 have been received and replayed on the backup VM 20-2.

For record/replay to function properly, virtual disks 24-1, 24-2 of primary VM 20-1 and backup VM 20-2 should start in the same state. Thus images 24-1' and 24-2' should be identical at the initial state. Primary and backup VMs 20-1, 20-2 both read from and write to their corresponding virtual disks 24-1, 24-2, respectively, while executing. Since backup VM 20-2 executes the same instructions as primary VM 20-1 through record/replay, backup VM 20-2 will perform the same IO to its virtual disks 24-2 as primary VM 20-1 does to its virtual disks 24-1, and therefore the virtual disks 24-1, 24-2 will naturally stay synchronized. In one embodiment, the initiation of a disk IO is not logged in log entries 280 because it is a deterministic result of the VM's behavior. However, the completion of a disk IO is logged in the log entries 280 because the exact execution point of the VM at the time the completion interrupt is delivered to the VM is non-deterministic. In addition, the completion status of each disk IO is also logged in the log entries 280, since the completion status is another potential non-deterministic result of the disk IO.

Figure 3:
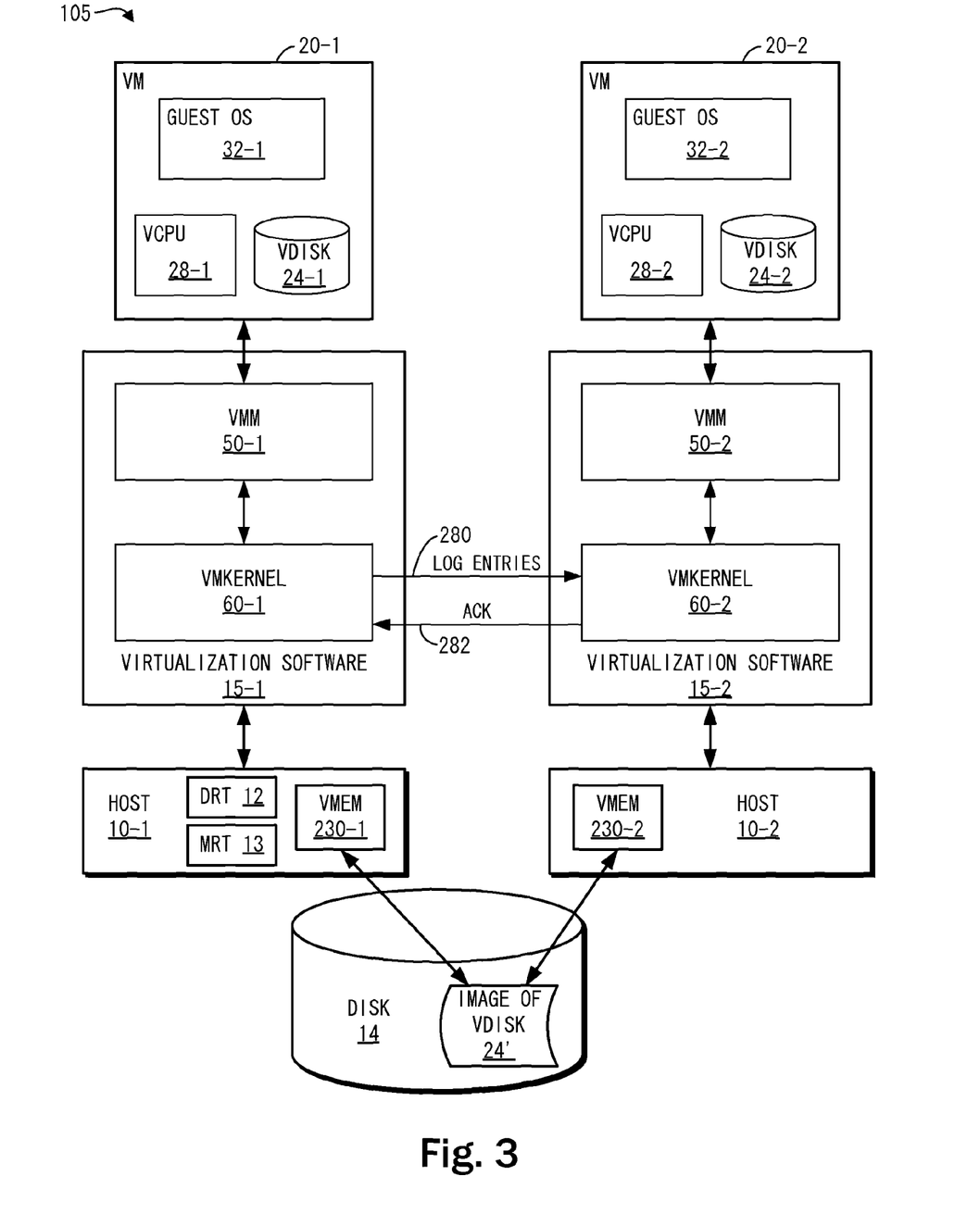
FIG. 3 illustrates a system for providing fault tolerance using a backup VM supporting the primary VM, with the primary VM and backup VM each accessing a shared virtual disk on a shared storage device, according to one embodiment.

FIG. 3 illustrates a system 105 that is also suitable for providing fault tolerance using a backup VM supporting a primary VM. In this embodiment, the primary VM and the backup VM each access a shared virtual disk image 24' on shared physical devices.

Virtualization software 15-1 is logically interposed between and interfaces with primary VM 20-1 and primary host 10-1. Likewise, virtualization software 15-2 is logically interposed between and interfaces with VM 20-2 and host 10-2. In this embodiment, each implementation of virtualization software 15-1, 15-2 includes a VMKernel 60-1, 60-2 for managing host system resources and a VMM 50-1, 50-2 for emulating virtual hardware of corresponding VMs. As described above with reference to FIGS. 1 and 2, other virtualization configurations are possible, as would be recognized by persons skilled in the art. When in a fault tolerance (FT) execution mode, i.e., not during fail-over, virtualization software 15-1 passes IO requests from primary VM 20-1 to host system hardware 10-1, allowing VM 20-1 to communicate externally of system 105. In contrast, virtualization software 15-2 blocks external communication sent by VM 20-2 when not in a fail-over mode. Backup VM 20-2 is configured to take over almost instantaneously for VM 20-1 if the primary host 10-1 or primary VM 20-1 fails. Virtualization software 15-1, 15-2 maps virtual disk 24-1, 24-2 to a common virtual disk image 24' shared by both VMs 20-1, 20-2.

In order to keep the two VMs 20-1, 20-2 in near lockstep for fault tolerance, all non-deterministic inputs or events encountered by primary VM 20-1 are recorded (logged) in log entries 280 and provided to backup VM 20-2. VMkernel 60-1 corresponding to the primary VM 20-1 records such logs and sends the log entries 280 to VMkernel 60-2 corresponding to backup VM 20-2. Backup VM 20-2 then uses log entries 280 to ensure that it executes exactly the same instruction stream as primary VM 20-1 (i.e., backup VM 20-2 replays the log). VMkernel 60-2 corresponding to backup VM 20-2 sends acknowledgments 282 back to VMkernel 60-1 corresponding to primary VM 20-1, indicating which log entries 280 have been received on backup VM 20-2 and which log entries 280 have been replayed on backup VM 20-2.

In this embodiment, primary VM 20-1 and backup VM 20-2 share virtual disk image 24'. That is, virtual disks 24-1, 24-2 for VMs 20-1, 20-2 are both mapped to the same virtual disk image 24'. In one embodiment, virtual disk image 24' resides on physical disk 14, which may reside externally of hosts 10-1, 10-2, e.g., as a SAN (storage area network) or NAS (network attached storage) disk resource, which can be a logical disk so as to include various redundant architectures for fault tolerance, such as RAID. By sharing a single virtual disk image 24', the fault tolerance (FT) mode may be started quickly without first requiring backup VM's virtual disks 24-2 to be synchronized with the contents of the primary VM's virtual disks 24-1 as in the separate virtual disk architecture shown in FIG. 2.

In the shared storage architecture of FIG. 3, primary VM 20-1 issues both reads and writes to virtual disk 24-1. During FT mode, the reads and writes are mapped by virtualization software 15-1 to image 24' and the mapped IO requests are then issued to disk 14. Concurrently with VM 20-1, backup VM 20-2 issues corresponding reads and writes to virtual disk 24-2. However, virtualization software 15-2 maps only read IO requests to image 24' of disk 14. All the write IO requests issued by backup VM 20-2 are marked as completed by virtualization software 15-2 without actually issuing them to disk 14.

In the shared-disk architecture, since primary VM 20-1 and backup VM 20-2 each access the same virtual disk image 24', backup VM 20-1 will typically read identical data from virtual disk image 24' that primary VM 20-1 reads at the same point in its execution. However, backup VM 20-2 is not in exact lockstep with the primary VM 20-1. Specifically, backup VM 20-2 typically runs a little, e.g., on the order of hundreds of milliseconds, behind primary VM 20-1. This delay occurs because it takes some time for backup VM 20-2 to receive log entries 280 and "replay" the logged events of the primary VM 20-1. Therefore, when primary VM 20-1 issues a read to a particular location L on shared virtual disk image 24', and then very quickly issues a write to the same location L on shared virtual disk image 24', backup VM 20-2 may incorrectly read the new value written to location L rather than the old value that primary VM 20-1 previously read from location L. This disparity can cause execution on backup VM 20-2 to diverge from the execution of primary VM 20-1.

Figure 4A:
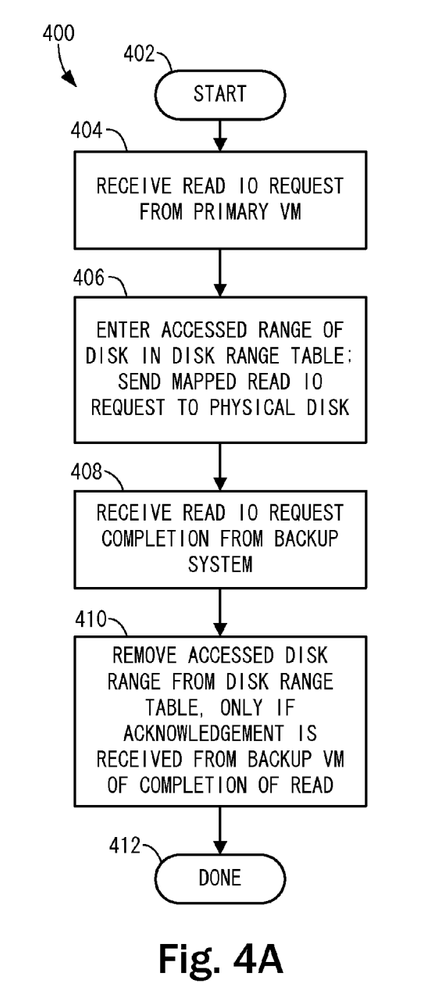
FIGS. 4A and 4B show flowcharts illustrating a method for handling conflicting read/write accesses to the virtual disk by the primary VM and the backup VM using a shared virtual disk, according to one embodiment.
Figure 4B:
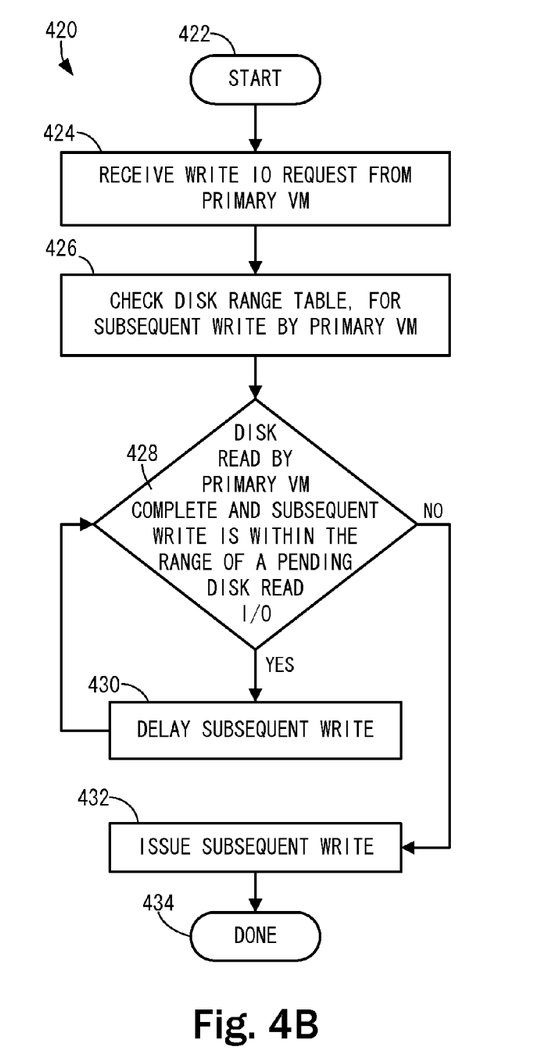

FIGS. 4A and 4B show flowcharts 400, 420 that illustrate, by way of example, a method for handling conflicting read/write accesses to the virtual disk by the primary VM and the backup VM using a shared virtual disk. The method illustrated in FIGS. 4A, 4B is specific to the shared storage architecture of FIG. 3. In this embodiment, IO tracking may be implemented to avoid incorrect disk reads by the backup VM.

Flowchart 400 of FIG. 4A illustrates an exemplary method performed by virtualization software 15-1 on primary host 10-1 when a read IO request is received from primary VM 20-1. The procedure begins as indicated by start block 402 and proceeds to operation 404 wherein a read IO request is received from the primary VM. In operation 406, virtualization software 15-1 enters the accessed disk range corresponding to the read IO request into a "disk range table" 12 (DRT in FIG. 3). The disk range table comprises one or more data structures that maintain information about read IO requests received from the primary VM and issued to primary host 10-1 that have not yet been completed by backup host 10-2. The disk range table may be stored in memory allocated by the VMkernel 60-1 of the primary host 10-1. In alternate embodiments, the disk range table may be stored elsewhere, such as on disk 14 or realized in hardware on the primary host 10-1. The accessed disk range is the set of locations on the virtual disk 24-1 that the read IO request accesses, specified for example by the set of disk bytes or disk sectors or blocks being accessed. Since each disk block or sector of virtual disks 24-1, 24-2 are mapped to offsets in disk image 24', the disk range can also be specified in terms of a list or a range of offsets into disk image 24'.

After entering the data into the disk range table, the read IO is processed normally and primary VM may continue to execute. At some point, physical disk 140 will return an interrupt to host 10-1 indicating that the requested data has been retrieved, and this interrupt is passed to the primary VM along with a log of the interrupt event to the backup host 10-2. Backup host 10-2 will be concurrently processing a corresponding read request and will also at some point receive an interrupt indicating that the requested data has been retrieved. At this point, backup host 10-2, by way of virtualization software 15-2, will send an acknowledgement of the interrupt log, indicating completion of the read IO request. In operation 408, primary host 10-1 receives the acknowledgement from backup host 10-2 indicating that backup host 10-2 has completed the read IO request. In response to receipt of this acknowledgement, the procedure flows to operation 410, wherein the accessed disk range is removed from the disk range table. Removing this accessed disk range from the disk range table indicates that the backup VM 20-2 has also executed at least to the point of the completion of the same read. Otherwise, the accessed disk range information remains in the disk range table. The procedure then ends as indicated by done block 412. The method described above with reference to flowchart 400 ensures that disk range table 12 includes every read IO request issued by the primary VM that is not yet completed by the backup VM.

Flowchart 420 of FIG. 4B shows an exemplary method performed by virtualization software 15-1 on primary host 10-1 when a write IO request is received from primary VM 20-1. The procedure begins as indicated by start block 422 and flows to operation 424 wherein virtualization software 15-1 receives a write IO request from the primary VM. In response to this event, the procedure flows to operation 426, wherein virtualization software 15-1 for the primary VM checks disk range table 12 prior to issuing a disk write to virtual disk image 24' on physical disk 14. Proceeding to operation 428, it is determined whether a pending disk read has not completed at the time of receiving the write IO from VM 20-1, or if the disk write is to a location on virtual disk 24-1 that is within or overlaps the range of a pending disk read I/O that is entered in disk range table 12. If so, then the procedure flows to operation 430. If the disk read on primary VM 20-1 has not completed yet, then there is a race between IOs on primary VM 20-1, which will be explained below in more detail below with reference to FIGS. 8A and 8B below.

In operation 430, virtualization software 15-1 delays issuing the disk write from primary VM 20-1 until acknowledgment of completion of the disk read by backup host 10-2 is received from backup host 10-2. In this case, there is no need to suspend primary VM 20-1, because the disk write on primary VM 20-1 is issued asynchronously. Thus, execution of primary VM 20-1 is allowed to continue. When the acknowledgment of completion of the disk read by the backup host 10-2 is received by the primary host 10-1, then the procedure flows to operation 432 wherein the write is issued to physical disk 14.

As can be seen by flowcharts 400, 420, the above described methods use disk range table 12 to ensure that the backup VM completes its read operation prior to issuing a subsequent write by the primary VM's host to the physical drive.

Figure 5:
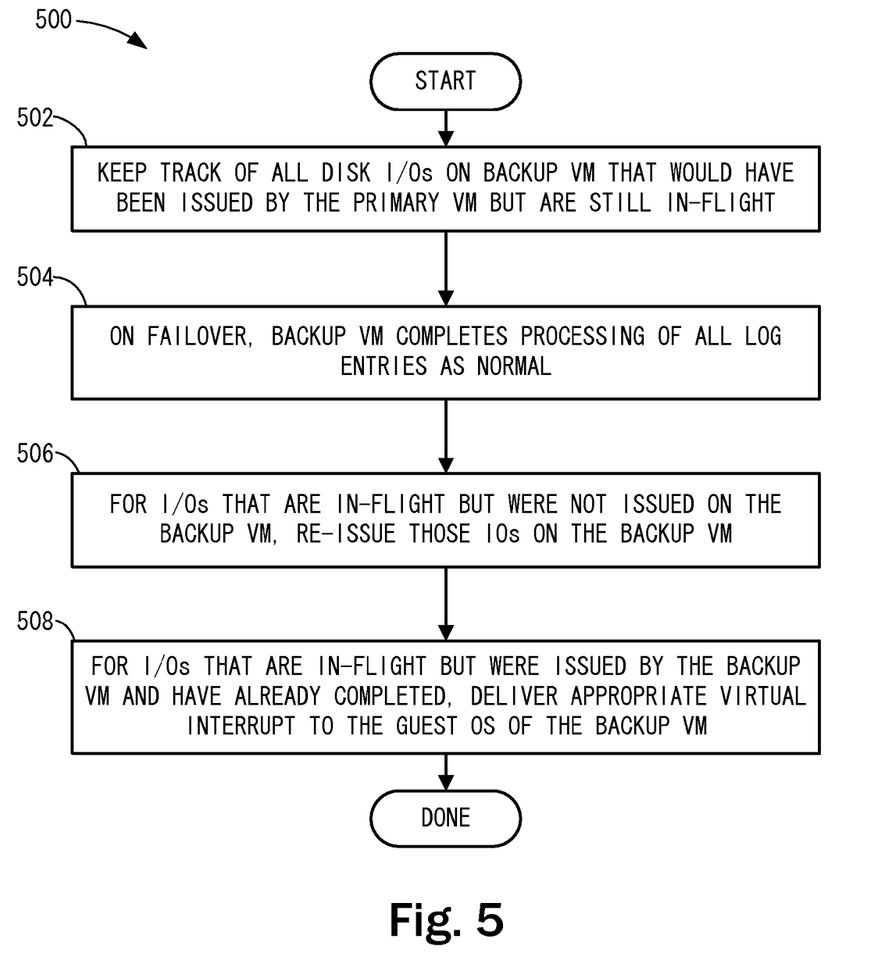
FIG. 5 is a flowchart illustrating a method for issuing IOs on the backup VM after a failover occurs, according to one embodiment.

FIG. 5 shows flowchart 500, illustrating a method for issuing IOs on the backup VM after a failover occurs, according to one embodiment. Note that the method of FIG. 5 may be used with the shared storage architecture of FIG. 3 as well as the non-shared storage architecture of FIG. 2. As mentioned above, in the shared-disk architecture of FIG. 3, backup VM 20-2 does not issue writes to the shared virtual disk image 24'. If primary VM 20-1 has a number of IOs in flight (issued but not completed) and then fails, then the backup VM takes over while those IOs are in flight. This causes a number of issues. First, the IOs may never have actually made it to physical disk 14, and in the case of disk writes in a shared-disk architecture, the IOs may never have actually modified virtual disk image 24'. Also, any IOs completions will be going back to the failed host 10-1 that was executing primary VM 20-1. Therefore, backup VM 20-2 that takes over will not get any logged completion interrupts for any of these write IOs that were in flight but were not issued by backup VM 20-2. Guest OS 32-2 of the backup VM 20-2 (that takes over as the primary VM) can recover from these lost IOs by simply aborting any IOs for which it receives no completions, and then reissuing the IOs. However, this process takes a long time, significantly slowing down or temporarily freezing the guest OS 32-2, which is not desirable.

Thus, according to one embodiment, in step 502 virtualization software 15-2 for backup VM 20-2 keeps track of IOs that would be in flight if they were on the primary VM 20-1 but were not issued because it is the backup VM 20-2. In the shared-disk architecture of FIG. 3, such IOs would contain all the writes to disk 14 that are in-flight. Since backup host 10-2 receives information on every IO is completed in log entries 280 from the primary VM 20-1, backup host 10-2 would be able to determine exactly which IOs are still in flight. In step 504, if a failover occurs (i.e., the backup VM 20-2 takes over because the primary VM 20-1 failed), virtualization software 15-2 on backup host 10-2 completes the processing of all the received log entries 280 as normal. Then, in operation 506, virtualization software 15-2 on backup host 10-2 re-issues all IOs generated by the primary VM 20-1 that were still in flight when the primary VM 20-1 failed but were never completed on backup host 10-2. In operation 508, for read or write I/Os that are in flight when primary VM 20-1 failed and were issued in backup host 10-2, virtualization software 15-2 for backup host 10-2 delivers the appropriate virtual interrupt to guest OS 32-2 of backup VM 20-2. Operation 508 may be performed for both shared and non-shared storage architecture of FIGS. 2 and 3. At this point, the backup VM 20-2 (which has now taken over as the primary VM) is fully live, and it handles all the IO completions normally.

Figure 6:
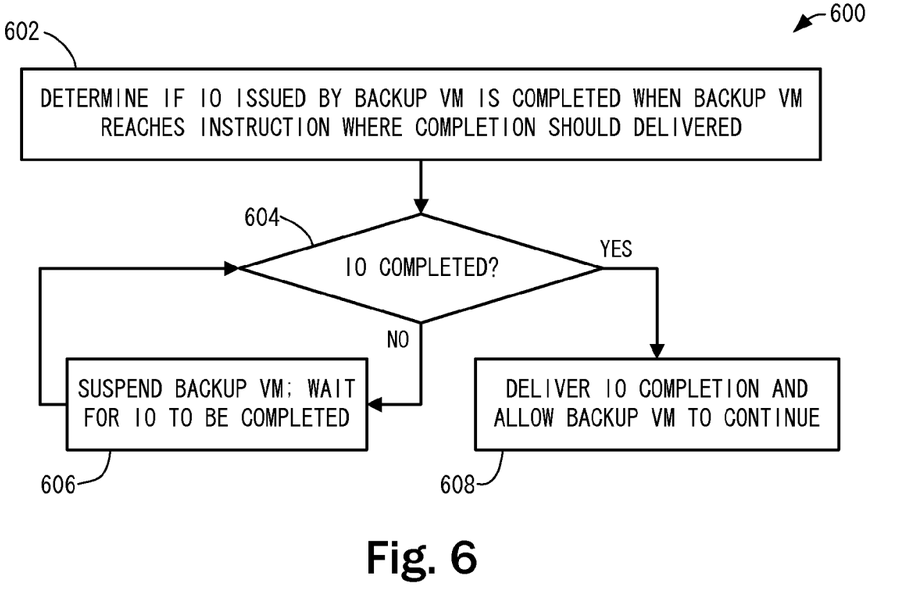
FIG. 6 is a flowchart illustrating a method for completing IOs on the backup VM, according to one embodiment.

FIG. 6 shows flowchart 600 illustrating by way of example a method for completing IOs on the backup VM. Note that the method of FIG. 6 may be used with the shared storage architecture of FIG. 3 as well as the non-shared storage architecture of FIG. 2. If an IO is issued on backup VM 20-2, its completion must be delivered to guest OS 32-2 at the exact instruction that is indicated by the log entries 280, so that backup VM 20-2 is in synchronization with the primary VM 20-1. However, since access times to disks 14-1 can vary widely, the IO issued by backup VM 20-2 may not actually have completed when the backup VM 20-2 has executed up to such instruction that is indicated by the log entries 280. This may be especially true in the non-shared disk architecture of FIG. 2 if the backup VM's disk 14-2 has a slower access time then the primary VM's disk 14-1.

Thus, in one embodiment, the virtualization software 15-2 determines in operation 602 whether the IO issued by backup VM 20-2 is completed when backup VM 20-2 reaches the instruction where the completion of the IO should be delivered. If the IO is completed at operation 604, then the procedure flows to operation 608 wherein the IO completion is delivered to backup VM 20-2 to allow backup VM 20-2 to continue. However, if the IO is not completed at operation 604, then the procedure flows to operation 606 wherein virtualization software 15-2 (e.g., VMkernel 60-2) suspends execution of backup VM 20-2 and waits for the IO to complete before delivering the completion of the IO and allowing the backup VM 20-2 to continue.

Figure 7:
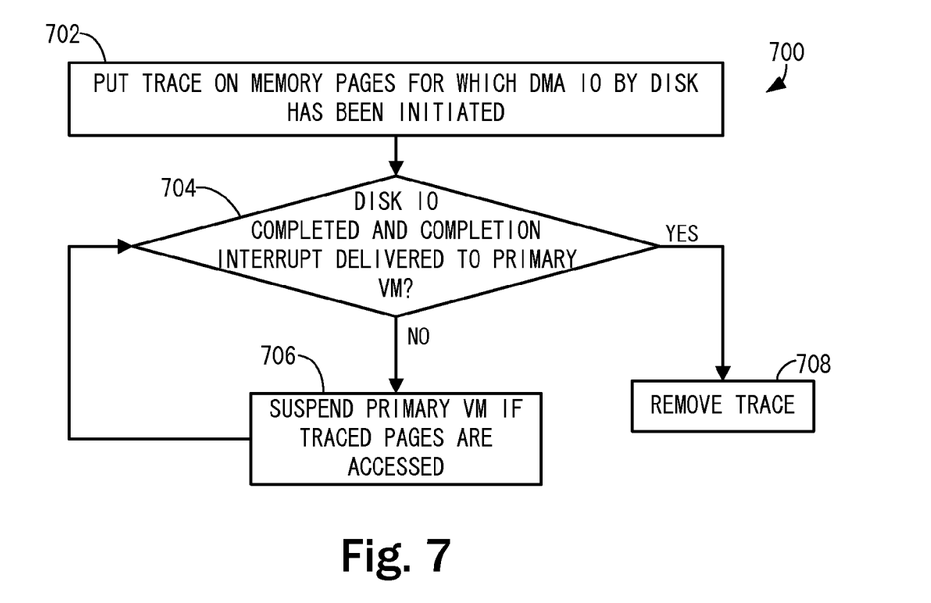
FIG. 7 is a flowchart illustrating a method for handling races between DMA IOs and VM memory accesses, according to one embodiment.

FIG. 7 shows flowchart 700 illustrating by way of example a method for handling races between DMA IOs and VM memory accesses. Note that the method of FIG. 7 may be used with the shared storage architecture of FIG. 3 as well as the non-shared storage architecture of FIG. 2. Guest OS 32-1 running in primary VM 20-1 may cause races if it attempts to access a memory region on which DMA IO by disk 14-1 has been initiated, since it is undetermined exactly when the DMA IO will complete. If the primary VM 20-1 and backup VM 20-2 execute these races in different ways (i.e., the relative ordering of direct memory access completion and guest OS access to memory differs), then they will potentially execute differently and diverge.

Thus, in this embodiment, at operation 702, VMkernel 60-1 puts traces on memory pages for which a disk IO on primary VM 20-1 has been initiated. A "trace" is a mechanism employed by VMkernel 60-1 that allows for notification if primary VM 20-1 accesses a particular memory page. Memory traces are well understood in the art of computer virtualization. In operation 702, the traces are added when a disk IO has been initiated. In operation 704, it is determined whether the disk IO is completed and an interrupt notifying completion of the disk IO is delivered to primary VM 20-1. If the disk IO is not complete or the completion interrupt is not yet delivered to the primary VM, then the procedure flows to operation 706, wherein if a trace is "triggered," i.e., the guest OS 32-1 is accessing a memory page while an outstanding IO is occurring to that memory page, then the memory access by the guest OS 32-1 is delayed by suspending primary VM 20-1 until after the disk IO completes and the completion interrupt is delivered to primary VM 20-1, at which point the procedure flows to operation 708 wherein the trace is removed. Of course, virtualization software 15-1 does not impede accesses to memory pages that are not traced.

With the technique described above with reference to FIG. 7, backup VM 20-2 will automatically conduct the same deterministic behavior as in primary VM 20-1, since according to the log entries 280 the IO completion will be delivered (and hence the IO will be complete on backup VM 20-2) immediately prior to the instruction that has the racy memory access.

Figure 8A:
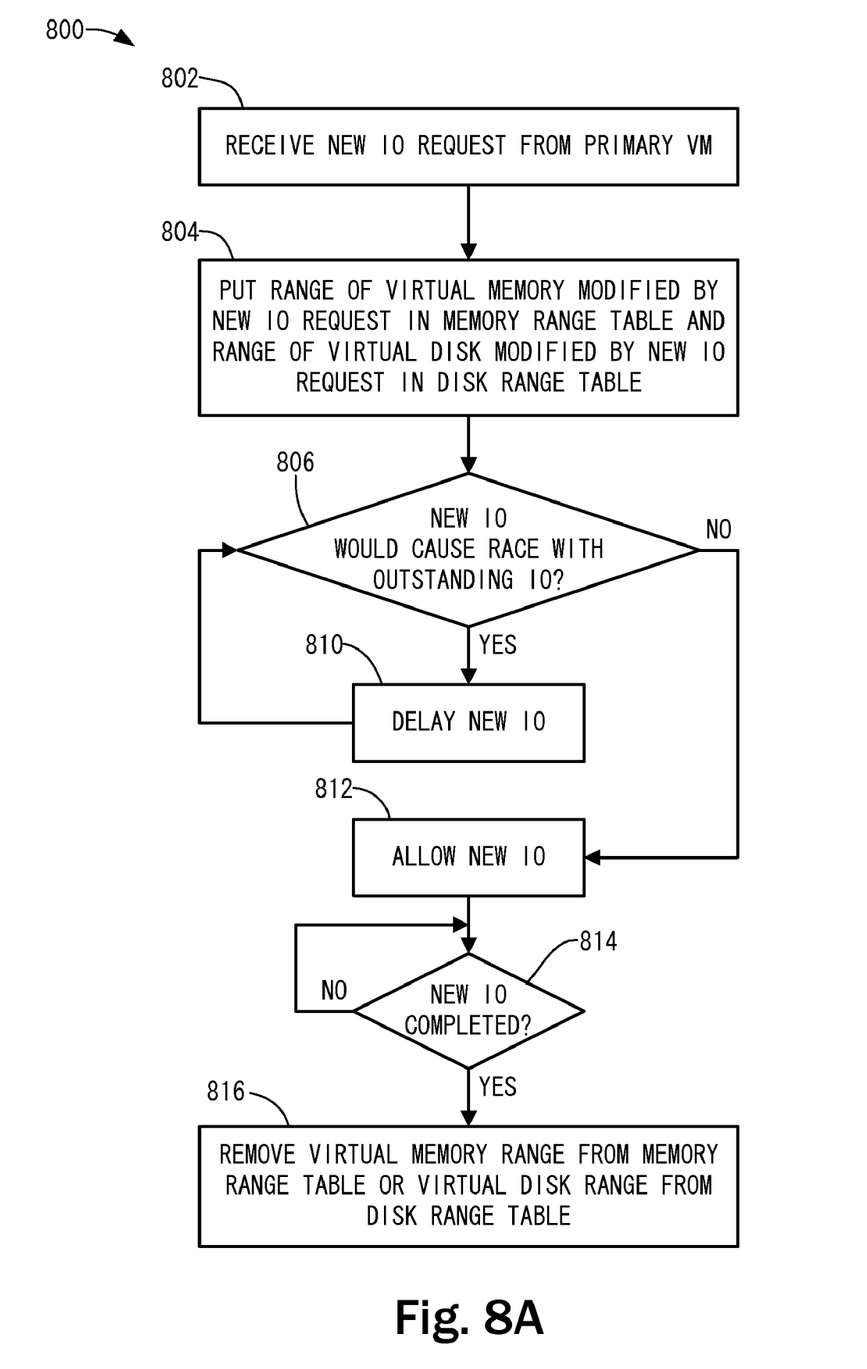
FIG. 8A is a flowchart illustrating a method for handling races among multiple IOs by the primary VM, according to one embodiment.

FIG. 8A shows flowchart 800 illustrating by way of example a method for handling races among multiple IOs by the primary VM. Note that the method of FIG. 8A may be used with the shared storage architecture of FIG. 3 as well as the non-shared storage architecture of FIG. 2. It is possible for guest OS 32-1 to cause races by initiating multiple IOs that attempt to access same location in the VMEM 230-1 in a conflicting way, or access the same location on the virtual disk 24-1 in a conflicting way. These situations may occur by (i) two disk reads to the same virtual memory location, (ii) a disk read and a subsequent disk write to the same virtual memory location, (iii) a disk write and a subsequent disk read from the same virtual memory location, (iv) two writes to the same virtual disk location, (v) a disk read and a subsequent disk write to the same virtual disk location, and (vi) a disk write and a subsequent disk read from the same virtual disk location. These possibilities may be detected by tracking all IO issued by primary VM 20-1.

In operation 802, a new IO request is received from primary VM 20-1 by virtualization software 15-1. In response, the procedure flows to operation 804 wherein, for each IO issued by primary VM 20-1, VMkernel 60-1 enters the range of VMEM 230-1 modified in one or more data structures referred to herein as "memory range table" (MRT) 13 (see FIGS. 2, 3) and the range of virtual disk 24-1 modified in a data structured referred to as disk range table (DRT) 12. The accessed memory range is the set of locations on VMEM 230-1 that are accessed, specified for example by the addresses of the physical memory bytes or pages that are being accessed. The accessed disk range is the set of locations on the virtual disk 24-1 that are accessed, specified for example by the identifiers for the set of disk bytes or disk sectors being accessed. The memory range table 13 and the disk range table 12 may be stored in memory allocated by VMkernel 60-1 of primary host 10-1. Note that memory range table 13 and disk range table 12 may be stored elsewhere, such as on virtual disk 24-1 or realized in hardware on primary host 10-1. These entries are added to the tables when an IO issued, and removed when the IO completes.

The procedure flows to operation 806 wherein VMkernel 60-1 checks the memory range table and the disk range table to determine whether the new IO can cause a race with an outstanding IO. If the new IO attempts to access the same memory or same disk block entered in the memory range table or the disk range table, respectively, then the conflicting IOs are presumed to potentially create a race condition. A "race" herein refers to any situation in which there would be non-determinism over the results of various accesses to the virtual memory or virtual disk by parallel operations.

If the new IO does not conflict with an outstanding IO in operation 806, then the procedure flows to operation 812 wherein the new IO is processed (allowed). However, when a conflict is detected with an outstanding IO in operation 806, then the procedure flows to operation 810 wherein VMkernel 60-1 delays issuing the new IO until the previous IO has completed, i.e., until the memory range table or disk range table no longer contain conflicting entries. Once the previous IO request completes, then the procedure flows to operation 812 wherein the new IO request is processed. The procedure then flows to operation 814 to determine if the new IO request has completed. Once the new IO completes and the interrupt indicating completion of the IO has been delivered to the primary VM 20-1, then the procedure flows to operation 816 wherein the entry made in operation 804 is cleared from the memory range table or disk range table.

In one embodiment, the procedure described above with reference to FIG. 8A may be performed for each IO request received from the primary and backup VMs in corresponding VMkernels 60-1, 60-2. This ensures that, in each VM, the first IO to the same virtual memory page or virtual disk range is completed before a second conflicting IO is issued, and the race is thereby avoided. In another embodiment, the dependent ordering of the two IOs (i.e., that a subsequent IO should not be issued until the previous conflicting IO is complete) is logged to backup VM 20-2, and this is used to ensure that the same ordering is maintained on backup VM 20-2.

Figure 8B:
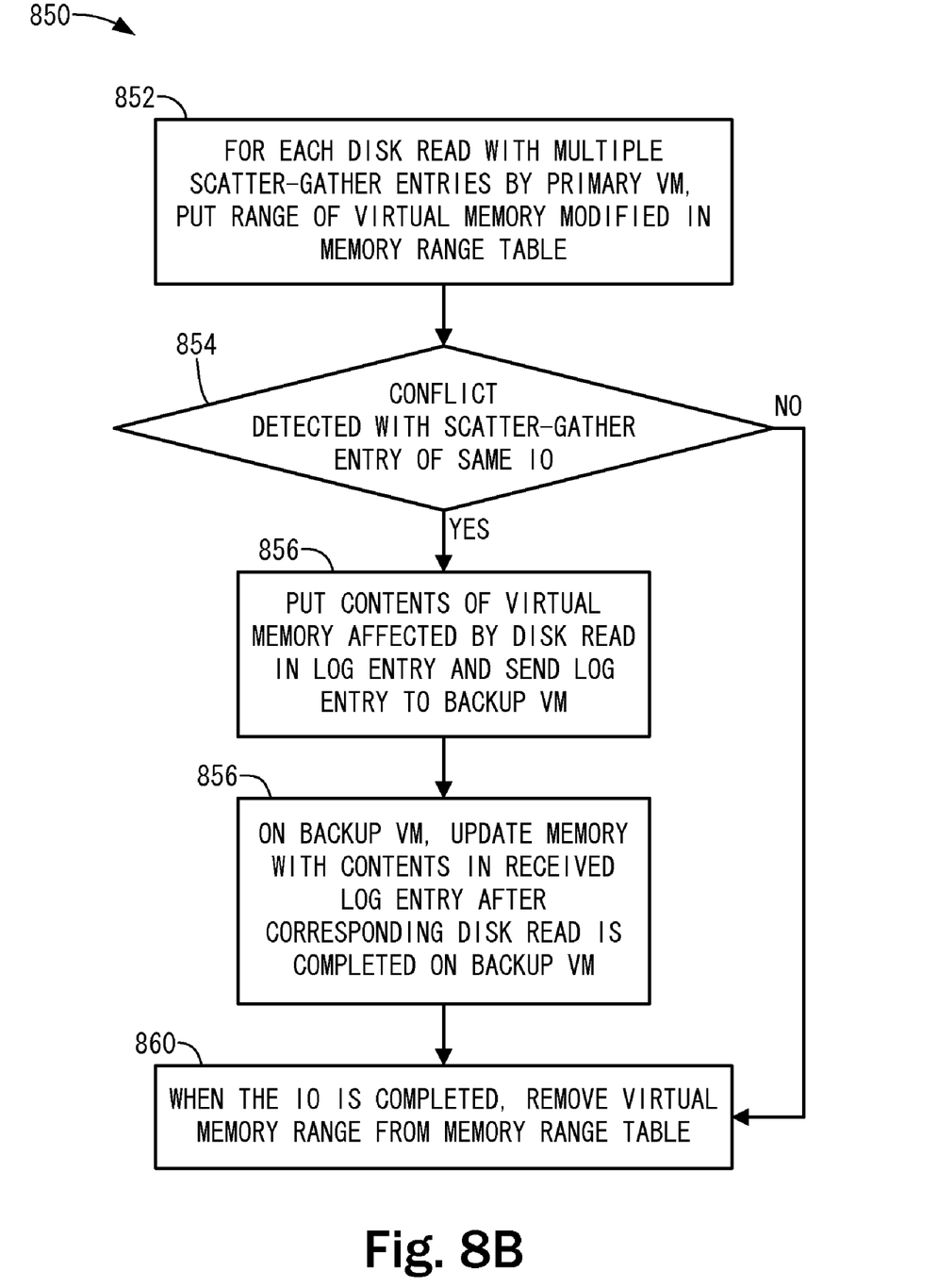
FIG. 8B is a flowchart illustrating a method for handling a race in a single IO by the primary VM, according to another embodiment.

FIG. 8B shows flowchart 850 illustrating by way of example a method for handling a race in a single IO by primary VM 20-1. Note that the method of FIG. 8B may be used with the shared storage architecture of FIG. 3 as well as the non-shared storage architecture of FIG. 2. Similar to the races between multiple IOs as explained with FIG. 8A, it is possible for guest OS 32-1 to issue a single disk read (concurrently, a DMA write access to VMEM 230-1) that has a race within itself, if the guest OS 32-1 issues a disk read with multiple scatter-gather entries having more than one scatter-gather entry targeting the same location in VMEM 230-1. A scatter-gather array is a specification that the data being read from disk 14 should be stored in multiple specific ranges of virtual memory VMEM 230-1. Each scatter-gather entry of a scatter-gather array specifies one range of VMEM 230-1. Since it is not necessarily determined which scatter-gather entry to the same location in the VMEM 230-1 will complete first, the contents of VMEM 230-1 after the IO can be non-deterministic. Thus, IOs that have these inherent memory races must be detected and handled so as to ensure determinism.

In one embodiment, for each disk read with multiple scatter-gather entries by primary VM 20-1 the VMkernel 60-1 enters the range of the VMEM 230-1 modified in memory range table 13 in step 852. The modified memory range is the set of locations on VMEM 230-1 that are being modified, specified for example by the addresses of physical memory bytes or pages that are being modified. The memory range table is stored in memory allocated by the VMkernel 60-1 of the primary host 10-1. These entries are added to the memory range tables when an IO is issued, and removed as described below with reference to operation 860 when the IO completes. VMkernel 60-1 can therefore detect, in operation 854 if there would be a race among the scatter-gather entries of a single disk read IO. If no conflict is detected in operation 854, the procedure flows to operation 860 wherein the IO is completed and the target memory range is removed from the memory range table.

However, if a conflict with a scatter-gather entry of the same IO prior to the completion of the IO, then the procedure flows to operation 856, wherein VMkernel 60-1 puts the contents of VMEM 230-1 affected by the subsequent disk read in log entries 280 and sends log entries 280 over to backup VM 20-2 when the first disk read is completed. Then, in operation 856, on backup VM 20-2, VMEM 230-1 is updated with the contents in received log entries 280 after the corresponding IO has completed on backup VM 20-2. Thus, even though the disk reads may have different results on the two VMs 20-1, 20-2, it can be ensured that the contents of the affected virtual memory will be the same after the log entries 280 are processed by backup host 10-2.

When an IO is issued on both primary VM 20-1 and backup VM 20-2 at the same point in the VM execution (for example, a read or a write in the non-shared storage architecture of FIG. 2, or a read in the shared storage architecture of FIG. 3), it is possible that one of these IOs will succeed and the other IO will fail with a disk error status or that both IOs will fail but with different error statuses. Often, the disk failure is a temporary condition, but it may sometimes be more permanent. In any of these situations, the IO may have partially or completely modified virtual disk 24-1, 24-2 or VMEMs 230-1, 230-2, even if the IO returns an error status. Thus, the disk or memory may be in a somewhat undetermined state.

Figure 9A:
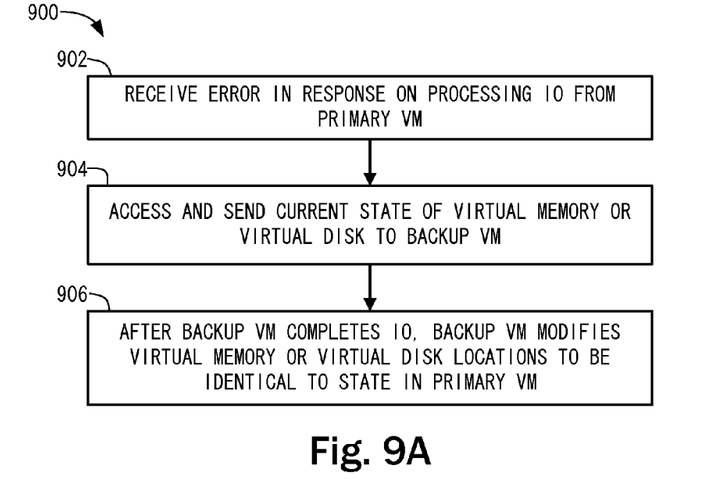
FIGS. 9A and 9B show flowchart illustrating by way of example a method for handling IOs that are completed with different completion statuses on the primary VM and the backup VM.

FIG. 9A shows flowchart 900 illustrating a method for handling IOs that are completed with different completion statuses on the primary host and the backup host, wherein the IO processed for the primary VM returns an IO error. Note that the method of FIG. 9A may also be used with the shared storage architecture of FIG. 3 as well as the non-shared storage architecture of FIG. 2. The procedure begins in operation 902 wherein an error is returned on primary host 10-1 in response to processing a guest IO for primary VM 20-1. Of course, if the IO for primary VM 20-1 does not return an error, then VMkernel 60-1 conducts normal recording of log entries 280 to send to backup VM 20-2 for replay as described above. However, when the IO for the primary VM 20-1 returns an error, the procedure flows to operation 904 wherein VMEM 230-1 or virtual disk image 24-1' (FIG. 2) or 24' (FIG. 3) that was to be modified by the IO on primary VM 20-1 is actually accessed to determine its current state. The gathered state information of VMEM 230-1 or virtual disk image 24-1' (or 24') is sent to backup host 10-2 as part of log entries 280.

The procedure then flows to operation 906, wherein, the corresponding IO for backup VM 20-2 is allowed to complete (either with an error status or successfully), and VMEM 230-2 or virtual disk image 24-2' locations corresponding to backup VM 20-2 are modified by VMkernel 60-2 so that they have the same state as primary VM 20-1, as indicated in log entries 280. Although VMEM 230-1 or virtual disk image 24-1' may or may not have been modified by the failed IO, operations 904, 906 ensure that, if a change to VMEM 230-1 or virtual disk 24-1 is indeed made despite a failed IO on primary VM 20-1, VMEM 230-2 or virtual disk 24-2 corresponding to backup VM 20-2 reflects the same change. In the shared disk architecture of FIG. 3, backup VM 20-2 does not perform any disk writes, so only VMEM 230-2 needs to be modified according to the log entries 280 in operation 906. In the non-shared disk architecture of FIG. 2, backup VM 20-2 also performs disk writes, so virtual disk 24-2 may potentially need to be modified if, for example, a disk write operation on the primary VM 20-1 failed, but the same disk write operation succeeded on the backup VM 20-2.

Figure 9B:
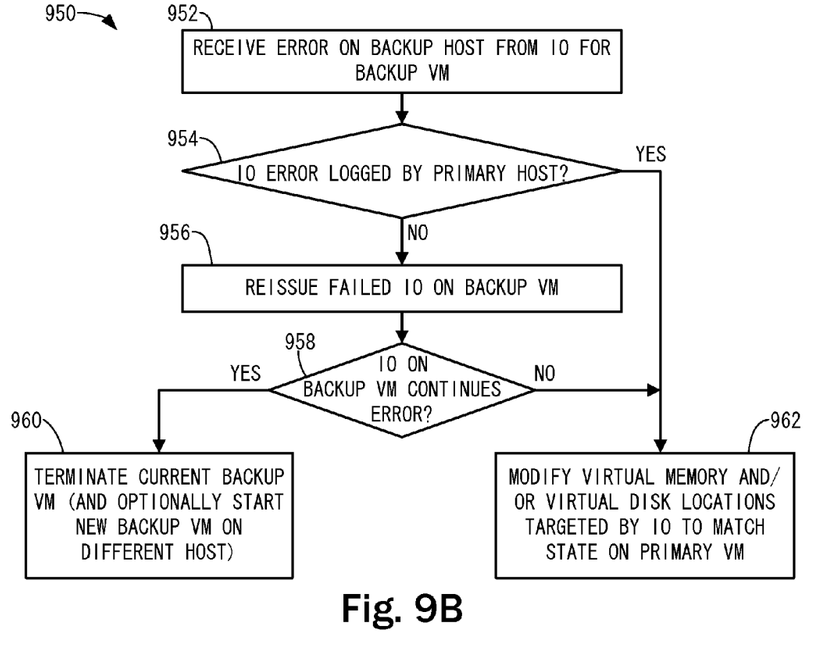

FIG. 9B presents flowchart 950 illustrating by way of example a method handling errors returned when processing a guest IO for the backup VM. Note that the method of FIG. 9B may be used with the shared storage architecture of FIG. 3 as well as the non-shared storage architecture of FIG. 2. The method of FIG. 9B may be used to handle the situation where an IO succeeds on the primary VM 20-1, but the same IO returns an error status on the backup VM 20-2.

The procedure is initiated in operation 952 when the backup host 10-2 receives an IO error in response to an IO for backup VM 20-2. Of course, if the IO on the backup host 10-2 does not return an error, then VMkernel 60-2 allows normal replay of the received log entries 280 in the backup VM 20-2 as described above. However, if the IO on the backup host 10-2 returns an error, then VMkernel 60-2 proceeds to operation 954 wherein the returned error status is compared with any error status identified in the corresponding log 280 received from primary host 10-1. If primary host 10-1 has returned an error, as reflected in logs 280, then the procedure flows to operation 962 wherein the logged entries are replayed. The situation of flowchart 900 will have applied, so step 962 is essentially performing operation 906 described above with reference to FIG. 9A. However, if the primary host successfully completed the IO, then the procedure flows to operation 956, wherein VMkernel 60-2 re-issues the failed IO on the backup host 10-2.

The procedure then flows to operation 958, wherein VMkernel 60-2 determines whether the reissued IO on backup host 10-2 continues to return an error status. If the error on backup host 10-2 was transient, then the reissued IO on the backup host 10-2 will likely succeed and the backup VM 20-2 will reach the correct state in its VMEM 230-2 and/or on the virtual disk 24-2. Thus, the procedure flows to operation 962 wherein backup VM 20-2 is allowed to normally replay the received log entries 280. However, if the error on the backup host 10-2 continues to recur in step when the IO is re-issued in operation 956 (i.e., the error is permanent), then the procedure flows to operation 960 wherein, in one embodiment, backup VM 20-2 is terminated. A new backup VM may also be started on a different host system, for example, by the virtualization software 15-1 on the primary host 10-1.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer readable storage medium for providing shared storage architecture in a fault-tolerant virtualized computer system, the fault-tolerant virtualized computer system comprising a primary host executing a primary virtual machine (VM) and a backup host executing a backup VM, the computer readable storage medium embodying machine instructions causing the backup host to implement a method, the method comprising:

receiving a virtual disk IO request from the backup VM, the virtual disk IO request being identical to a corresponding virtual disk IO request issued by the primary VM;

when the virtual disk IO request is a read request, mapping the virtual disk IO request to a physical read IO request of a virtual disk image stored on a physical disk, and issuing the physical read IO request to the physical disk;

when the virtual disk IO request is a write request, assuming a completed status of the disk IO request without mapping the virtual disk IO request or issuing a mapped physical IO request to the physical disk;

receiving a log entry from a primary host, the log entry containing a completion interrupt and execution point for the corresponding virtual disk IO request issued by the primary VM; and     replaying the completion interrupt in the backup VM at an execution point in execution of the backup VM, the execution point corresponding to the execution point identified in the log entry.

2. The computer readable storage medium of claim 1, wherein the method further comprises:

responsive to failure of the primary VM, identifying a set of virtual disk IO requests having corresponding disk IO requests generated by the primary VM that were in flight at the time the failover occurred but for which a mapped physical IO request has not been issued to the physical disk, the set being identified as each virtual disk IO request that has been received from the backup VM but for which no completion interrupt log entry has been received, less ones of the virtual disk IO requests for which a mapped physical IO request has been issued to the physical disk;

mapping each virtual disk IO request of the set of virtual disk IO requests to mapped physical disk IO requests; and     issuing the mapped physical disk IO requests to the physical disk.

3. The computer readable storage medium of claim 1, wherein the execution point identified by the log entry is reached by the backup VM prior to receipt of a completion interrupt for the physical IO request, and the method further comprises:

suspending the backup virtual machine until the completion interrupt is received.

4. A computer readable storage medium for providing a fault-tolerant virtualized computer system, the fault-tolerant virtualized computer system comprising a primary host executing a primary virtual machine (VM) and a backup host executing a backup VM, the computer readable storage medium embodying machine instructions causing the backup host to implement a method, the method comprising:

receiving a virtual IO request from the backup VM, the virtual IO request being identical to a corresponding virtual IO request issued by the primary VM;

receiving a log entry from a primary host, the log entry containing a completion interrupt and execution point for the corresponding virtual IO request issued by the primary VM,     determining whether the log entry received from the primary host indicates that an error status was returned when processing the corresponding virtual IO request;

in response to a determination that the log entry indicates that the error status was returned, modifying virtual memory of the backup VM or a second virtual disk of the backup VM with the current state of a first virtual memory or a first virtual disk provided by the primary virtual machine in the log entry.

5. The computer readable storage medium of claim 4, wherein the method further comprises:

mapping the virtual IO request to a physical IO request of a physical device that is mapped to a virtual device accessible by the backup VM, and issuing the physical IO request to the physical device;

receiving a completion interrupt in response to the issuing of the physical IO request;

determining whether the completion interrupt contains an IO error status;

determining whether the IO error status of the completion interrupt is different from an IO completion status indicated in the log entry, the IO completion status being one of a plurality of IO error statuses or a successful status; and     terminating the backup virtual machine when the IO error status of the completion interrupt is different from the IO completion status indicated in the log entry.

6. The computer readable storage medium of claim 5, wherein the method further comprises:

reissuing the physical IO request prior to terminating the backup virtual machine; and     terminating the backup virtual machine only when the reissued physical IO request returns the error status.

7. The computer readable storage medium of claim 5, wherein the method further comprises:

starting a third VM to provide fault tolerance to the primary VM.

8. A computer readable storage medium for providing shared storage architecture in a fault-tolerant virtualized computer system, the fault-tolerant virtualized computer system comprising a primary host executing a primary virtual machine (VM) and a backup host executing a backup VM, wherein the primary VM has a virtual disk mapped to a disk image on a physical disk by virtualization software executing on the primary host and the backup VM has a virtual disk mapped to the disk image on the physical disk by virtualization software executing on the backup host, the computer readable storage medium embodying machine instructions causing the primary host to implement a method, the method comprising:

for each disk read IO request received from the primary VM, entering an accessed range of a virtual disk supported by the shared storage device in a disk range data structure, the accessed range defining a set of locations on the virtual disk of the primary VM that are targeted by the disk read IO request; and     for each disk write IO request received from the primary VM, determining if the disk write IO request is directed to the disk range entered in the disk range data structure and if so, delaying the disk write operation until the disk read operation is completed by the backup virtual machine and the accessed range is removed from the disk range data structure.

9. The computer readable storage medium of claim 8, wherein the method further comprises:

installing a trace on one or more memory pages targeted by direct memory access (DMA) when satisfying the disk read IO request;

removing the trace on completion of the DMA; and responsive to triggering of the trace by a guest operating system running on the primary VM accessing the memory pages, suspending the primary VM until the direct memory access is completed and the trace is removed.

10. A computer readable storage medium for providing a fault-tolerant virtualized computer system, the fault-tolerant virtualized computer system comprising a primary host executing a primary virtual machine (VM) and a backup host executing a backup VM, the computer readable medium embodying machine instructions causing the primary host to implement a method, the method comprising:
receiving a first virtual device IO request from the primary VM, the first virtual device IO request being at least one of a read or a write to addressable memory of the virtual device;
in response to the receiving, entering an accessed range of the device in a range data structure, the accessed range being an identification of the portions of the addressable memory identified by the first virtual device IO request;
mapping the first virtual device IO request from the primary VM to a physical device IO request and issuing the physical device IO request to a physical device that is mapped to the virtual device;
receiving a second virtual device IO request form the primary VM, the second virtual device IO request being received after the receipt of the first virtual device IO request;
determining whether the second virtual device IO request is directed to the accessed range of the device entered in the range data structure; and
delaying issuing a physical IO operation mapped from the second virtual device IO request until the first physical IO request is completed.

11. The computer readable storage medium of claim 10, wherein the device is a virtual disk mapped to disk shared by the primary host and the backup hosts.

12. The computer readable storage medium of claim 10, wherein the device is a virtual memory.

13. The computer readable storage medium of claim 10, wherein the first virtual device IO request includes a scatter-gather array having a first scatter-gather entry and a second scatter-gather entry, and the method further comprises:
entering an accessed range of a first virtual memory corresponding to the first scatter-gather entry in a memory range data table;
determining whether the second scatter-gather entry is directed to the accessed range of the device;
responsive to determining that the second scatter-gather entry is directed to the accessed range, adding contents corresponding to the entered accessed range of the first virtual memory in a log entry; and
sending the log entry to the backup host.

14. A method for deterministically accessing storage resources in a fault-tolerant system wherein a first virtual machine (VM) executes on a first host and a second VM executes on a second host, the second VM providing fault tolerance for the first VM, the storage resources comprising a first virtual disk accessible by the first VM and a second virtual disk accessible by the second VM, the method comprising:
executing virtualization software on the first host, the virtualization software being logically interposed between and interfacing with the first VM and the first host, wherein the virtualization software:
receives a virtual disk IO request issued by the first VM to the virtual disk;
maps the virtual disk IO request to a corresponding physical disk IO request, the physical disk IO request defining an IO access of a physical disk, the physical disk being accessible by the first host;
enters an accessed range of the physical disk IO request in a range data structure;
determines from the range data structure whether the physical disk IO request is directed to a conflicting accessed range of a pending physical disk IO request;
delays issuing the physical disk IO request when the physical disk IO request is directed to the conflicting accessed range, the physical disk IO request being delayed until the pending physical disk IO request is completed and the accessed range of the device is removed from the range data structure; and
issues the physical disk IO request to a first physical disk when the physical disk IO request is not directed to a conflicting accessed range;
sends the log entries containing information regarding each nondeterministic event associated with the first VM to the second host so that the second host can inject corresponding nondeterministic events into the VM machine and the second VM can replicate the execution of the first VM.

15. The method of claim 14, wherein:
virtualization software executing on the second host maps the second virtual disk to physical disk such that a single virtual disk image on the physical disk is accessed by the first VM and the second VM.

16. The method of claim 15, wherein the virtualization software executing on the second host maps virtual disk read IO requests issued by the second VM to the physical disk and marks virtual disk write IO requests as completed without mapping the virtual disk write IO requests to the physical disk.

17. The method of claim 16, wherein the virtualization software executing on the second host, in response to a failover from the first VM to the second VM, maps virtual disk write IO requests to physical disk IO requests and issues the physical disk IO requests to the physical disk for corresponding physical disk write IO requests that were generated by the first host and were in flight on the first host at the time the failover occurred.

18. The method of claim 14, further comprising:
sending, in response to a physical IO request on the first host returning an error status, a current state of at least a portion of a first virtual memory or the first virtual disk targeted by the physical IO request to the second VM in the log entry, the sending being performed by the virtualization software executing on the first host; and
replicating the state sent by the first host on the second host, the replicating being performed after the second host completes a physical IO request that corresponds to the physical IO request on the first host, the replicating being performed by virtualization software executing on the second host.

* * * * *